Figure 1:
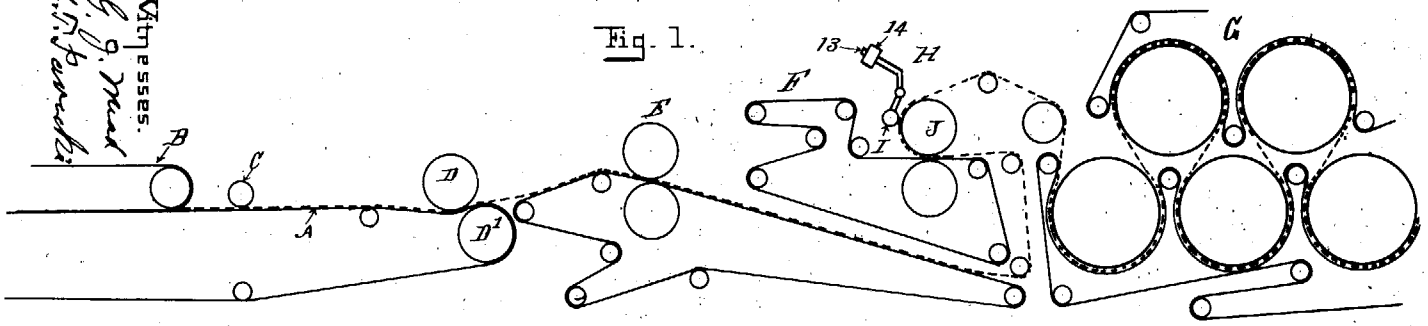

No. 12,218. REISSUED MAY 10, 1904.

E. R. & O. F. BEHREND.

DEVICE FOR WATERMARKING PAPER.

APPLICATION FILED AUG. 26, 1903.

2 SHEETS—SHEET 1.

Witnesses.
G. J. Mead
H. T. Paruchi

Inventors,
Ernst R. Behrend
Otto F. Behrend
By J. C. & H. M. Sturgeon
Atty's.

No. 12,218. REISSUED MAY 10, 1904.
E. R. & O. F. BEHREND.
DEVICE FOR WATERMARKING PAPER.
APPLICATION FILED AUG. 26, 1903.
2 SHEETS—SHEET 2.
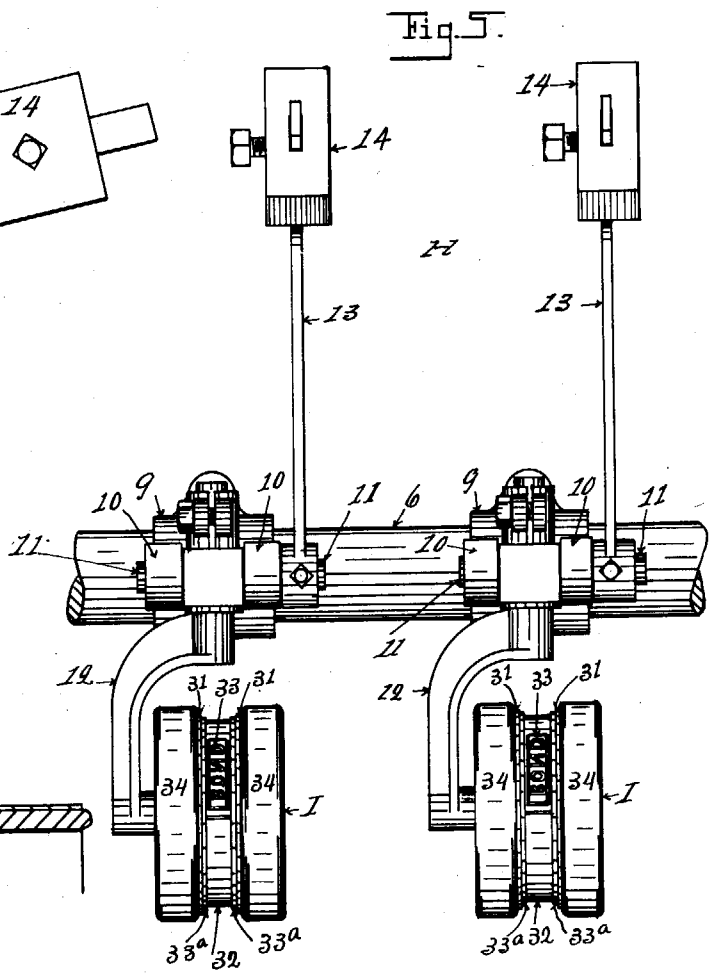
Witnesses.
G. J. Mead
H. T. Kavicki
Inventors.
Ernst R. Behrend
Otto F. Behrend
By J. C. & W. M. Sturgeon
Atty's.

No. 12,218. Reissued May 10, 1904.

UNITED STATES PATENT OFFICE.

ERNST R. BEHREND AND OTTO F. BEHREND, OF ERIE, PENNSYLVANIA.

DEVICE FOR WATERMARKING PAPER.

SPECIFICATION forming part of Reissued Letters Patent No. 12,218, dated May 10, 1904.

Original No. 711,815, dated October 21, 1902. Application for reissue filed August 26, 1903. Serial No. 170,800.

*To all whom it may concern:*

Be it known that we, ERNST R. BEHREND, a citizen of the United States, and OTTO F. BEHREND, a subject of the Emperor of Germany, both residing at Erie, in the county of Erie and State of Pennsylvania, have invented certain new and useful Improvements in Devices for Watermarking Paper, of which the following is a full, clear, and exact description.

Our invention relates to watermarking paper; and it consists, substantially, in a watermarking mechanism for paper-making machines which operates to produce ineffaceable water-marks in a web of paper by compressing and displacing portions of the fiber in the paper-web with which the watermarking device contacts while it is in a damp and soft condition, such compression and displacement of the fibers to produce the water-mark taking place after the paper-web has passed the couch-rolls and before it enters the calenders of the paper-making machine.

One of the features of our invention involves the application of a watermarking mechanism to a paper-making machine at a suitable point between the couch-rolls and the calender-rolls thereof, the watermarking mechanism preferably embodying a watermarking-roll carrying suitable marking devices and arranged to operate under suitable pressure upon a damp and soft paper-web as it passes between said watermarking-roll and a hard moving surface operating in opposition thereto, such as a press-roll, a drying-roll of a paper-making machine, or a traveling band.

Another feature of our invention involves the making of the type or other marking devices used upon the watermarking-rolls of resilient material, such as rubber, so that in their operation upon a damp and soft web of paper as it passes between the watermarking-roll and a rotating press-roll or other hard traveling surface the faces of the type or other marking devices are compressed by the pressure exerted on the watermarking-roll, which compression tends to spread the faces of the type or other marking devices upon the damp and soft paper-web, which spreading operates to carry portions of the paper fiber laterally in all directions therewith, leaving the portions of the web against which the faces of the type or marking devices contact slightly thinner because of such displacement of portions of the fiber, and thereby producing an ineffaceable water-mark in the paper-web.

Our type of watermarking mechanism may be applied to a paper-making machine at any suitable point between the couch-rolls and the driers—for example, at a point opposite to a roll in the first, second, or third presses of a paper-making machine, in case as many as three presses are used; but we do not confine ourselves to the application of the watermarking mechanism to the particular parts of the paper-making machine aforementioned, as we may place the marking mechanism opposite to a drier or one of the rolls of the drier or the press part, according to the suitability of the position therefor.

It is well known to those skilled in the art that the process of making paper on a paper-making machine is practically divided into four steps—first, forming the web of paper, which is accomplished on an endless band of wire-netting having very fine meshes; second, pressing the embryo paper-web in order to express the surplus water therefrom; third, drying the paper-web in order to evaporate the water which is present in the web after it leaves the presses, and, finally, calendering the web, so as to finish it previous to forming the web into rolls or sheets.

So far as we are aware the operation of watermarking paper as ordinarily practiced is to bring a wire-covered roll carrying suitable designs into contact with a very soft mass of pulpy paper while it is being carried on an endless band of wire-netting. At this step the paper is just beginning to form, so that it is in a very pulpy condition and readily takes an impression when making certain grades of paper. On other grades of paper it is almost impossible to secure a good plain water-mark when the paper is treated to secure the water-mark impression at the forming stage on the endless wire band of netting. We are also aware that it has been proposed to watermark paper by means of devices situated between the dandy and couch rolls and at or near the dandy-roll, so that the embryo paper-web will have the desired impression imparted thereto before it passes through the couch-rolls. It has also been brought to our attention that means have been provided for watermarking paper after it shall have passed through the entire machine and is in a perfectly dry condition.

From the foregoing explanation it will be seen that a watermarking device has been placed opposite the endless wire-netting at a point between the dandy-roll and the couch-rolls, and, second, that a watermarking device has been applied to operate on the paper as it passes between the first and second rolls of the calenders, such last-mentioned watermarking device operating on the paper-web during the calendering or finishing operation and after it shall have been dried more or less thoroughly.

It is to be understood that the old process thus far described involves the watermarking of paper at the opposite extremities of the machine—namely, when the paper is first forming and after it has been fully formed and dried.

To enable others skilled in the art to understand our invention, we have illustrated one embodiment thereof in the accompanying drawings, forming a part of this specification, in which similar characters of reference indicate corresponding parts in all the views.

Figure 3:
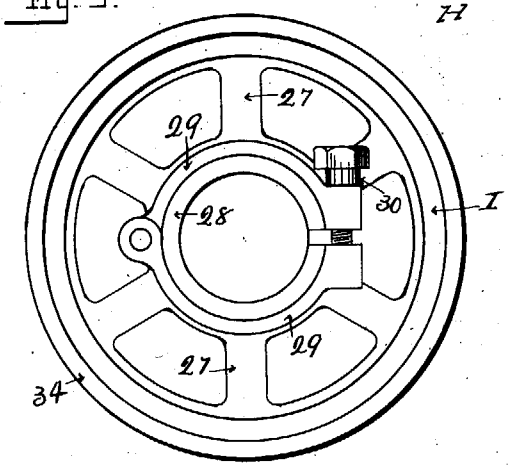
Figure 2:
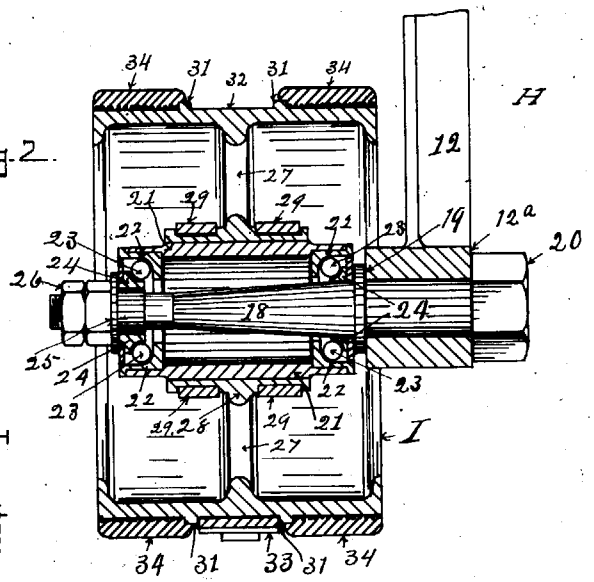

Figure 1 is a skeletonized view of a part of a paper-making machine illustrating the application of our watermarking device to the second press. Fig. 2 is an enlarged vertical transverse section through one form of the watermarking-roll. Fig. 3 is an end elevation of the roll shown in Fig. 2. Fig. 4 is an enlarged sectional elevation through a part of a paper-making machine, illustrating one embodiment of means for operatively mounting the watermarking-roll. Fig. 5 is an elevation at right angles to Fig. 4, illustrating one construction by which a series of watermarking-rolls may be individually mounted on a single shaft, so as to be adjusted simultaneously thereby.

In the ordinary paper-making machine (illustrated partly by Fig. 1) the endless wire-netting is indicated by the reference-letter A, and the deckle-strap is indicated at B. In the rear of the deckle-strap and above the endless wire-netting is the dandy-roll C, and the coacting couch-rolls D D′ are at the rear of the endless wire-netting. The paper-machine herein shown embodies two presses, (indicated at E and F for the first and second presses, respectively,) and in the rear of the second press is located one or more driers, one of said driers being indicated at G. It will be understood, however, that the watermarking device may be employed with a paper-making machine using one, two, or three presses, or more, or with a paper-making machine having one or more driers.

Our invention contemplates the employment of a watermarking device, which is indicated in its entirety by the reference-letter H and which is located at a point to operate on the paper while it is in a damp and soft condition and after it shall have passed beyond the couch-rolls D D′.

In a paper-making machine having two presses we prefer to locate the marking device H opposite to a roll of the second press; but if the machine employs three presses it is preferable to locate the marking device opposite to a roll of the third press. It may sometimes be desirable, however, to locate the marking device opposite to the first press or at the first or second driers, and it will therefore be understood that we reserve the right to locate the said watermarking device opposite to the paper-web at a point between the couch-rolls and the calenders.

We will now proceed to describe one specific embodiment of means for watermarking the paper, reference being had more particularly to Figs. 2, 3, 4, and 5.

The numeral 5 indicates that part of the framework of the paper-making machine in which is journaled a transverse shaft 6, to one end of which shaft is attached a hand lever or crank, (indicated at 7.) One or more outwardly-extending hangers or arms 8 are clamped, as at 9, to this transverse shaft, and said hangers or arms are each bifurcated or forked and are provided with upwardly-opening bearings 10, the same being adapted to receive the pivots or trunnions 11 of the roll-carrying arms 12, the latter being arranged to depend below the supporting hangers or arms 8.

The watermarking-roll (one or more of which may be used) is indicated by the reference character I, and it is idly or loosely mounted on the lower end of the depending arm 12. This watermarking-roll is mounted in opposition to the hard-surfaced revoluble roll J and presses against the damp and soft paper-web (shown in dotted lines) passing around said revoluble roll J, which forms part of the paper-making machine. The pressure of the watermarking-roll against the roll J upon the damp and soft paper-web passing over the same is produced in the mechanism shown by a tension device consisting of an upwardly and rearwardly bent arm 13, secured to the axis 11 of the arm 12, upon the free end of which the marking-roll I is mounted, the arm 13 being provided with an adjustable weight 14, as illustrated in Figs. 4 and 5, whereby the pressure exerted by the marking-roll I against the roll J and upon the damp and soft paper-web passing between said rolls can be adjusted as desired. It is obvious, however, that the form of tension mechanism used may be varied within wide limits—as, for example, an adjustable spring mechanism could be used with equal facility in lieu of the arm and weight shown.

The movement of the depending arm 12 toward the roll J under the energy of the tension device is regulated by the employment of an adjustable stop, which is shown in the form of a set-screw 15, which is mounted in a depending lug 16 of the outwardly-extending hanger or arm 8. This set-screw is adjustable in the lug to lie in the path of the roll-carrying arm 12, and said set-screw is confined at its adjusted position by the check-nut 17. (See Fig. 4.)

The watermarking-roll is supported laterally of the arm 12 by the arbor 18, the same having a collar 19, adapted to abut against an eye 12[a] at the lower extremity of the arm 12. Through this eye passes one end of the arbor, which receives a clamping-nut 20, said nut and the collar coöperating with the eye formed in the end of the arm to clamp the arbor firmly in said arm. (See Fig. 2.)

21 designates a sleeve or bushing which is provided at its end portions with the ball-bearing cups 22, adapted to receive the bearing-balls 23, which ride upon the cones 24, that are fitted to the projecting portion of the arbor 18, whereby the sleeve or bushing is adapted to rotate with great freedom upon the arbor. A washer 25 is fitted on the arbor to engage one of the ball-bearings, and this washer is held in place by the nuts 26, whereby the sleeve or bushing may be readily dismounted from the arbor.

The watermarking-roll I is a cylinder having radial arms 27, which are joined to a hub 28, that is adapted to fit the sleeve or bushing 21, and this hub of the watermarking-roll is secured upon the sleeve or bushing 21 by the clamps 29, (see Figs. 2 and 3,) each clamp having a screw or bolt 30. The external surface of the roll I is preferably provided with annular circumferential ribs or flanges 31, which are arranged parallel to each other on opposite sides of the transverse center of said roll, thus reserving a space 32, which is adapted to receive plates 33, having type or other marking devices of resilient material thereon, as indicated in Figs. 2, 4, and 5.

The type or type-plates 33 may be secured to the roll by any suitable means, such as by screws; but in Fig. 5 we have shown elastic bands 33[a] for holding the type-plate 33 in the reserved space 32 of the roll.

The active surface of the roll is furthermore provided with cushions 34, which may be of rubber or other resilient material and secured or attached to the roll on opposite sides of the circumferential flanges 31.

Each roll I is intended to carry one or more removable plates 33, having type or other marking devices thereon made of rubber or other resilient material. These plates are secured to said roll so that the faces of the type or other marking devices thereon project slightly beyond the peripheries of the cushions 34, so that when they contact with the damp and soft paper-web passing between the marking-roll I and a hard roll J the pressure exerted by the tension device upon the marking-roll causes the faces of the type or other marking device to be compressed substantially to the plane of the cushions 34, which compression operates to spread the faces of the type or other marking devices upon the damp and soft paper-web and laterally displace portions of the damp and soft fiber immediately under the faces of the type or other marking devices, thereby permanently thinning portions of the web with which the faces of the marking devices contact and producing an ineffaceable water-mark in the paper-web.

It is evident that we may employ as many of the watermarking-rolls as are necessary, owing to the width of the web or sheet of paper. In Fig. 5 we have presented a series of these marking-rolls I individually mounted in a detachable manner on the shaft 6, whereby the rolls may be separately dismounted as desired. These rolls are individually hung or pivoted in the hangers 8, so as to be held by their tension devices in engagement with the damp and soft paper-web after the latter shall have been fully formed and subjected to the action of the couch-rolls, one or more presses, and partly to the action of the drier or driers, whereby the type are adapted to coöperate with a roll, as J, to compress and displace the fibers of the damp and soft paper-web and produce therein a sharp and ineffaceable water-mark. It is evident that the shaft 6 may be rocked or adjusted by the lever 7, so as to make the series of hangers 8 withdraw the rolls from engagement with the paper-web, thus simultaneously moving all the rolls of the series to inactive positions.

Although we have shown a series of rolls on the rock-shaft 6, it is evident that a single roll may be used and that this one roll may be of any desired length, so as to extend either part way or entirely across the machine. The rolls are driven separately—as, for example, by contact with the paper-web passing over a hard opposing roll, as J, of the paper-making machine; but it is evident that the roll may be driven by any suitable form of gearing.

The pressure of the marking-roll, which is of comparatively small diameter with relation to the roll J, is determined and regulated by the spring or weight tension device. In our case the small marking-roll is independent of the machine and of all other marking-rolls which may be embodied in the machine. It is not necessary to change the rolls to produce a new design, because the type or other marking device may be fastened to small plates 33, which can be attached to or detached from the marking-roll at pleasure. These detachable plates 33 are quite inexpensive, and any desired number of them may be attached to the roll.

In a paper-making machine we produce the best results by having the watermarking-roll driven frictionally by contact with the moving or traveling paper-web and by mounting said watermarking-roll on ball-bearings or their equivalents, so as to rotate with great freedom. At the same time this frictionally-driven and freely-revoluble roll is held in active position by a tension device, which makes the roll operate under pressure on the wet paper-web.

The cushion-surfaces of the marking-roll secure the desired frictional engagement between the roll and the moving web of paper, and as this roll is revoluble with great freedom it is possible to secure a peripheral speed of the roll to the lineal speed of the moving paper-web. This is a very advantageous feature of the improvement, because the marking-roll is prevented from "dragging" on the paper-web, so that the water-mark in the paper-web is exceedingly clear and distinct. The machine can be run or operated at practically unlimited speed and the productive capacity of the apparatus thereby increased, and all liability of the paper-web becoming torn or mutilated is obviated.

One of the important features of our invention is that the watermarking-roll is placed in a position to operate effectively on the work after the paper-web is fully formed and while it is in a wet and soft condition, thus making the device operate under the most favorable circumstances to secure a superior water-mark in paper. As is well known, the spread-out sheet of pulp-stock deposited on the shaking and traveling endless wire-web (indicated at A) of the ordinary Fourdrinier machine is carried to and between the couch-rolls D D′, and at this point the pulp-stock is converted into a continuous wet paper-web, after which it is subjected to the action of the presses (one or more) in order to express the surplus moisture from the web of paper. According to our invention the web of paper is watermarked before it is exposed to the drying action of the heated driers and while said web is in its wet and soft condition and subsequent to the complete formation of the product by the couch-rolls. This means for treating the production enables us to secure a sharply-defined ineffaceable water-mark in the paper-web, which result cannot be secured by the ordinary method of watermarking paper by the usual dandy-roll. Paper produced on a machine equipped with our improvements cannot have the water-mark obliterated or seriously impaired when subjected to the severe caustic-soda test well known to those skilled in the art of making paper.

Having thus described our invention, we claim as new and desire to secure by Letters Patent—

1. In a paper-making machine, a water-marking-roll provided with resilient water-marking devices, substantially as set forth.

2. In a paper-making machine, a water-marking-roll provided with removable resilient marking devices, substantially as set forth.

3. In a paper-making machine, a water-marking-roll marking provided with resilient marking devices operating in opposition to a hard surface to attenuate the portions of a paper-web passing between such marking-roll and such hard surface, by laterally spreading portions of the fiber thereof under the faces of the marking devices contacting therewith, substantially as set forth.

4. In a paper-making machine, a marking-roll situated between the couch-roll and the calenders, said marking-roll being provided with type-faces and with a frictional driving-surface adapted to have direct engagement with a traveling paper-web whereby the marking-roll is frictionally driven at a speed substantially equal to that of the paper-web, substantially as set forth.

5. In a paper-making machine, a water-marking-roll provided with cushion-surfaces adjacent to a watermarking device thereon, substantially as set forth.

6. In a paper-making machine, a water-marking-roll provided with cushion-surfaces, and with an intermediate type or watermarking-device receiving surface, substantially as set forth.

7. In a paper-making machine, a water-marking-roll provided with cushion-surfaces, a type or watermarking-device surface between the cushion-surfaces, and means for removably securing type or other watermarking devices on the type or watermarking-device surface, substantially as set forth.

8. In a paper-making machine, a water-marking-roll provided with resilient water-marking devices, and operating in opposition to a hard surface so that a paper-web will pass between said roll and such hard surface, and means for pressing the watermarking-roll against the paper-web during its traverse between said roll and the hard surface opposed thereto, whereby the watermarking-roll is frictionally rotated in unison with the travel of the paper-web, substantially as set forth.

9. In a paper-making machine, a water-marking-roll provided with resilient water-marking devices, and a frictional contact-surface, operating in opposition to a hard roll or hard traveling surface and adapted to engage a paper-web traveling between the water-marking-roll and the hard roll or surface opposed thereto, whereby the marking-roll is rotated by frictional contact with the paper-web at a peripheral speed substantially equal to the speed of travel of the paper-web, and means for pressing the watermarking-roll against the paper-web during its traverse between said roll and the hard roll or surface, and means for varying said pressure, substantially as set forth.

10. In a paper-making machine, a watermarking-roll provided with resilient watermarking devices and resilient contact-surfaces, operating against a hard roll or other hard traveling surface, and adapted to engage a paper-web traveling between the watermarking-roll and the hard roll or surface opposed thereto, means for yieldingly pressing said marking-roll against a paper-web passing between it and the opposing roll or hard surface, whereby said contact-surfaces of the marking-roll so engage the traveling paper-web that the marking-roll is rotated by frictional contact therewith at a peripheral speed substantially equal to the speed of travel of the paper-web, means for varying the pressure of the marking-roll against the paper-web and hard roll or surface opposed thereto, and means for moving the marking-roll out of contact with the paper-web, substantially as set forth.

In testimony whereof we have signed our names to this specification in the presence of two subscribing witnesses.

ERNST R. BEHREND.
OTTO F. BEHREND.

Witnesses:
M. BEHREND,
H. M. STURGEON.